Nov. 10, 1953 — R. J. IFIELD — 2,658,528
MEANS FOR PROVIDING A RESTRICTED
PASSAGE IN FLUID CONDUIT
Filed Aug. 12, 1949

Inventor
R. J. Ifield

Patented Nov. 10, 1953

2,658,528

UNITED STATES PATENT OFFICE 2,658,528

MEANS FOR PROVIDING A RESTRICTED PASSAGE IN A FLUID CONDUIT

Richard Joseph Ifield, Dural, New South Wales, Australia, assignor to Joseph Lucas Limited, Birmingham, England Application August 12, 1949, Serial No. 109,878

Claims priority, application Great Britain August 31, 1948

2 Claims. (Cl. 138—43)

1

The object of the present invention is to provide improved means for forming a restricted passage in a fluid conduit. Such a passage is required for a variety of purposes. In one example its purpose is to meter a small quantity of lubricating oil under variable conditions. The usual means for providing the restriction consists of a barrier having therein a plain hole of appropriate diameter. When the conditions to be satisfied involve the use of a hole of very small diameter, manufacturing or other difficulties are encountered.

It is already known to provide a restriction by means of an externally screw-threaded plug inserted in an internally screw-threaded hole, the interengaging threads being adapted to provide a helical passage for the fluid. This device, however, is also not free from disadvantages. Thus, for example, the resistance to flow may vary with the viscosity of the fluid, and the object of the present invention is to provide an improved restrictive means of the screw-threaded plug type, which is less susceptible to viscosity variations.

The invention comprises a screw-threaded part adapted to form a helical passage with a complementary part, and having at least one longitudinal groove, but preferably a plurality of such grooves, whose depth does not exceed the depth of the threads.

Figure 1:
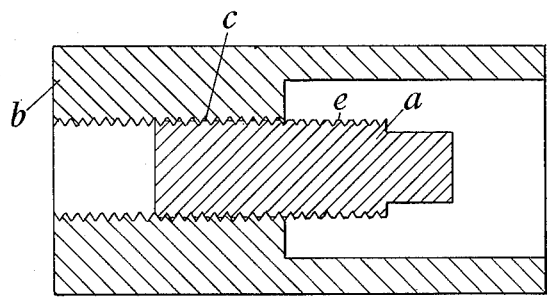
Figure 1 is a longitudinal section of a pair of interengaging and complementary screw-threaded parts forming between them a restricted fluid passage in accordance with the invention.
Figure 2:
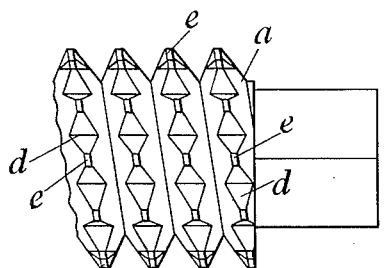
Figures 2 and 3 are respectively a side elevation and a cross section (to a larger scale than Figure 1) showing a portion of a screw-threaded plug made in accordance with the invention.
Figure 3:
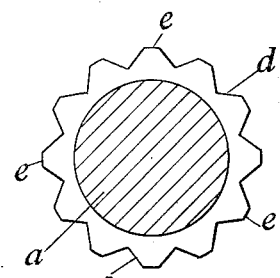
Figure 4:
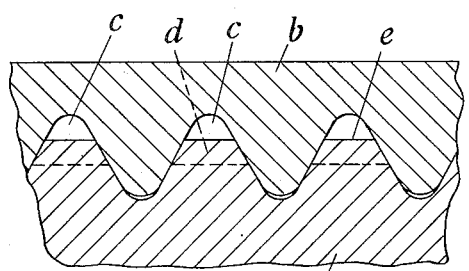
Figure 4 is a fragmentary longitudinal section (to a larger scale than Figures 2 and 3) showing an internally screw-threaded part having combined therewith an externally screw-threaded plug part made in accordance with the invention.

Referring to the drawings, there is employed an externally screw-threaded plug $a$ of any convenient diameter and length, this being adapted to be inserted in an internally screw-threaded part $b$. To provide the required helical passage $c$, the plug is made of such diameter that the crests of the thread do not bed closely on the bottom of the internal thread. Alternatively the bottom of the internal thread may be channelled. Otherwise the two threads fit together closely.

2

In addition and in accordance with the invention at least one longitudinal groove $d$ is formed along the plug, but preferably a number of similar and equi-spaced grooves are formed. The groove or grooves $d$ may be of any width appropriate to the conditions to be satisfied by the plug. In all cases, however, the depth of the groove does not exceed and is usually less than the depth of the thread. When a single groove is used this may subtend a large part of the circumference of the plug. For most purposes a plurality of grooves is more suitable, and in this case the widths of the grooves are such as leave relatively narrow ridge parts $e$ between adjacent grooves.

The effect of the groove or grooves is virtually to provide a number of orifices in series which are separated by relatively large gaps. This arrangement is less susceptible to viscosity changes than a device having a continuous passage, and consequently by appropriate dimensioning of the plug and providing an appropriate number of grooves of appropriate width, a restricted passage of any desired fluid resistance or metering capacity can be provided in a very simple and convenient manner.

The invention is not, however, limited to the example above described, as the longitudinal grooves may if desired be provided in the internally screw-threaded part.

Having thus described my invention what I claim as new and desire to secure by Letters Patent is:

1. Fluid flow controlling means comprising in combination a hollow part having an internal screw thread and another part having an external screw thread complementary to the internal screw thread, one of said screw threaded parts being formed with at least one longitudinal groove of a depth not exceeding the depth of the screw thread of said part, the screw threads of said parts being interengaged and between them forming a restricted helical passage through which fluid can flow and which by reason of said longitudinal groove includes a number of orifices in series which are separated by relatively large gaps and is thereby less susceptible to changes in the viscosity of the fluid flowing therein.

2. Fluid flow controlling means comprising in combination a hollow part having an internal screw thread, and another part having an external screw thread complementary to the internal screw thread, one of said screw threaded parts being formed with a plurality of longitudinal grooves which intersect the screw thread thereof leaving relatively narrow ridge parts between the adjacent grooves and the depth of which does not exceed the depth of the screw threads, the two screw threads being interengaged and defining between themselves a restricted helical passage through which fluid can flow, said passage by reason of said longitudinal grooves including a number of orifices in series which are separated by relatively large gaps and thereby being less susceptible to changes in the viscosity of the fluid flowing therein.

RICHARD JOSEPH IFIELD.

References Cited in the file of this patent

UNITED STATES PATENTS

| Number | Name | Date |
| --- | --- | --- |
| 1,879,197 | Greenwald | Sept. 27, 1932 |
| 1,980,052 | Hall et al. | Nov. 6, 1934 |
| 2,265,888 | Beck | Dec. 9, 1941 |
| 2,312,834 | Hahn | Mar. 2, 1943 |
| 2,323,115 | Bryant | June 29, 1943 |
| 2,460,407 | Andrus | Feb. 1, 1949 |
| 2,532,019 | Goldberg | Nov. 28, 1950 |